(12) United States Patent
Doh et al.

(10) Patent No.: US 9,690,273 B2
(45) Date of Patent: Jun. 27, 2017

(54) DEVICE FOR CONTROLLING LIGHTING BASED ON ILLUMINANCE MODEL, AND LIGHTING CONTROL METHOD USING THE DEVICE

(71) Applicant: Electronics and Telecommunications Research Institute, Daejeon-si (KR)

(72) Inventors: Yoon Mee Doh, Daejeon-si (KR); Jong Arm Jun, Daejeon-si (KR); Tae Wook Heo, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/147,031

(22) Filed: May 5, 2016

(65) Prior Publication Data
US 2016/0330820 A1 Nov. 10, 2016

(30) Foreign Application Priority Data
May 6, 2015 (KR) ........................ 10-2015-0063321

(51) Int. Cl.
G05B 13/02 (2006.01)
G05B 17/02 (2006.01)
H05B 37/02 (2006.01)

(52) U.S. Cl.
CPC ......... *G05B 17/02* (2013.01); *H05B 37/0218* (2013.01)

(58) Field of Classification Search
CPC .............................. G05B 13/04; G05B 15/02
USPC ...... 700/28, 29, 30; 315/149, 152, 291, 295, 315/297, 298, 324
See application file for complete search history.

(56) References Cited

U.S. PATENT DOCUMENTS

| | | | | |
|---|---|---|---|---|
| 7,566,137 B2* | 7/2009 | Veskovic | .................. | E06B 9/32 362/1 |
| 8,197,093 B2* | 6/2012 | Veskovic | .................. | E06B 9/32 250/214 AL |
| 8,860,316 B2* | 10/2014 | Barrilleaux | ........ | H05B 37/0245 315/152 |
| 2011/0215725 A1* | 9/2011 | Paolini | ................. | H05B 33/086 315/153 |
| 2012/0299485 A1* | 11/2012 | Mohan | ............... | H05B 37/0218 315/153 |

OTHER PUBLICATIONS

Dong-Gyu Jeong, "A Light Intensity Model and Its Control Algorithm in a Building Room," The Journal of Korean Institute of Information Technology, Apr. 2011, pp. 105-112.
Yao-Jung Wen et al., "Wireless Networked Lighting Systems for Optimizing Energy Savings and User Satisfaction," Proceedings of Wireless Hive Networks Conference, Aug. 7-8, 2008, pp. 1-7.

\* cited by examiner

*Primary Examiner* — Thuy Vinh Tran
(74) *Attorney, Agent, or Firm* — William Park & Associates Ltd.

(57) ABSTRACT

A device and method for controlling lighting based on an illuminance model. The method for controlling lighting based on an illuminance model includes modeling actual illuminance measured by one or more illuminance measurement devices; generating a lighting profile based on the illuminance model; and controlling one or more lighting devices for each lighting scene according to the generated lighting profile.

20 Claims, 5 Drawing Sheets

DEVICE FOR CONTROLLING LIGHTING BASED ON ILLUMINANCE MODEL, AND LIGHTING CONTROL METHOD USING THE DEVICE

CROSS-REFERENCE TO RELATED APPLICATION(S)

This application claims priority from Korean Patent Application No. 10-2015-0063321, filed on May 6, 2015, in the Korean Intellectual Property Office, the disclosure of which is incorporated herein by reference in its entirety.

BACKGROUND

1. Field

The following description relates to a technology for automatically controlling lighting.

2. Description of Related Art

One of the most realistic and effective ways to reduce energy consumption due to the use of lighting would be switching off the lamps or turning off the electronic devices not in use in vacant areas, for example, office rooms, classrooms, or conference rooms. The purpose of this method is to minimize the reduction of usable power. To this end, in the above method, a designated lighting scene may be recreated according to the presence or absence of a person in an area of interest or the time schedule for lighting control.

In addition, it has been suggested to control the brightness of a fluorescent lamp or a dimmable lamp so as to provide a specific level of illuminance. Yet, in another method, an illuminance level (lux) that is measured in real-time is compared with a desired illuminance level which is set by a micro controller, and the brightness of a lamp is automatically adjusted. When sunlight is utilized as a lighting source, it may be advantageous in that as much energy can be saved as is consumed by luminaires. However, the illuminance modeling of sunlight is not simple due to a number of variables, such as the season, weather, indoor building structure, and light transmittance through a window, and the like.

As an archetypal illuminance modeling method, illuminance L at the moment when light from a luminaire is irradiated in free space is calculated by Equation 1 below. FIG. 1 is a graph plotting Equation 1.

$$\text{Illuminance } L = \text{Luminous intensity}(cd)/(r)^2, [\text{Lux}] \qquad (1),$$

where r denotes a distance from a luminaire to an illuminance measurement device, luminous intensity refers to the intensity of light emitted from the luminaire, which varies depending on the type of luminaire. In reality, even when the same luminaire is used, the illuminance at the same point of interest may vary depending on the surroundings of the point, for example, a reflector located near said point.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The following description relates to a device for controlling lighting based on an illuminance model and a lighting control method using the device, which can provide a consistent level of illuminance in correspondence with a lighting scene intended by a user, regardless of changes in an environment.

In one general aspect, there is provided a device for controlling lighting based on an illuminance model, the lighting control device including: a profiler configured to set one or more lighting scenes to be recreated by one or more lighting devices in a separate area within a building, the separate area being partitioned into a plurality of sections, in each of which at least one of the lighting devices is installed, to generate a lighting profile for each of the set lighting scenes, and to modify the lighting profile by reflecting actually measured illuminance of the lighting devices; a lighting device controller configured to control each of the lighting devices in correspondence with a specific lighting scene according to a lighting profile that corresponds to the specific lighting scene; and an illuminance analyzer configured to analyze the actually measured illuminance of the lighting devices and construct an illuminance model based on the analysis result.

The modified lighting profile may be an environment-adaptive profile that is based on the illuminance model which has been constructed based on illuminance measured in an actually recreated lighting scene.

The lighting device controller may recreate the specific lighting scene by controlling each of the lighting devices according to the lighting profile generated by the profiler, and, when an illuminance measurement device has measured an actual illuminance of each of the lighting devices, the illuminance analyzer may analyze the actual illuminance measured by the illuminance measurement device to construct the illuminance model for each lighting scene.

The profiler may modify the lighting profile using the illuminance model for each lighting scene that is generated by the illuminance analyzer.

The lighting profile may be information required for a user to recreate an intended lighting scene by controlling each of the lighting devices, and contain information about switch ON/OFF state, dimming level, and color temperature of each lighting device for the lighting scene.

The lighting profile may further include distance information between the lighting devices.

The illuminance analyzer may include a contextual illuminance model generator configured to construct an illuminance model for each lighting scene and a reference illuminance model generator configured to construct a reference illuminance model.

The lighting device controller may sequentially activate the lighting devices to their maximum brightness, and when each of illuminance measurement devices at their measurement positions measures illuminance levels of the respective lighting devices that are sequentially activated, the lighting device controller may sum up the illuminance levels measured at each of the measurement positions to construct the reference illuminance model for each of the measurement positions.

The reference illuminance model may reflect illuminance of each lighting device that is set to its maximum brightness level in an actual environment, and the reference illuminance model generator may normalize the illuminance measured by an illuminance measurement device to an impact of each lighting device to said illuminance measurement device and construct the reference illuminance model based on the impact resulting from normalization.

The illuminance model for each lighting scene may reflect the illuminance of each lighting device that is set to a brightness level in correspondence with a specific lighting scene in an actual environment, and the contextual illuminance model generator may recognize the illuminance of each lighting device, which is measured by the illuminance measurement device in the specific lighting scene in the actual environment, as an impact of the corresponding lighting device to the illuminance measurement device, and construct the illuminance model for each lighting scene based on measured illuminance levels.

The lighting device controller may generate a lighting control signal according to the lighting profile, and transmit the lighting control signal to a corresponding lighting device, and the lighting control signal may include at least one of the following signals: a ON/OFF control signal, a dimming level control signal, and a color temperature control signal.

The separate area within the building may refer to an area that is influenced, not by external natural light, but solely by the lighting devices installed indoor.

In another general aspect, there is provided a method for controlling lighting based on an illuminance model, the method including: modeling actual illuminance measured by one or more illuminance measurement devices; generating a lighting profile based on the illuminance model; and controlling one or more lighting devices for each lighting scene according to the generated lighting profile.

Other features and aspects will be apparent from the following detailed description, the drawings, and the claims.

Figure 1:
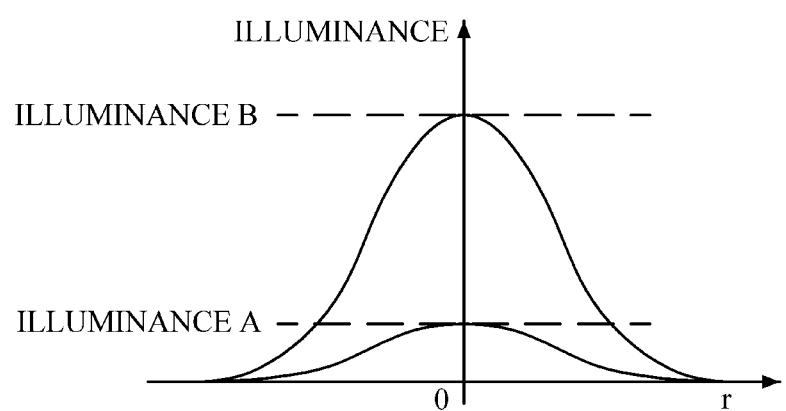
FIG. 1 is a graph showing a relation between an illuminance and a distance from each luminaire to an illuminance measurement device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
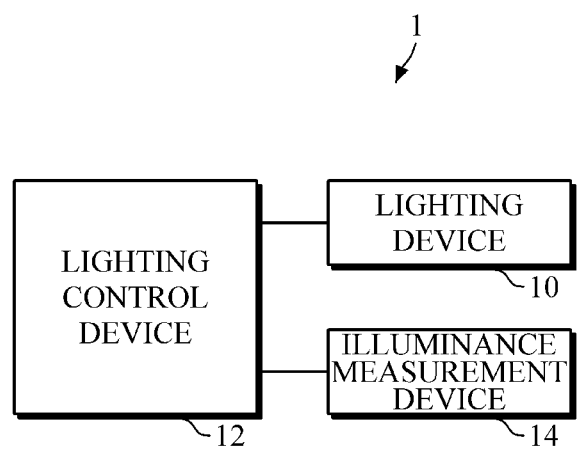
FIG. 2 is a diagram illustrating a configuration of a lighting system according to an exemplary embodiment of the present disclosure.

FIG. 2 is a diagram illustrating a configuration of a lighting system according to an exemplary embodiment of the present disclosure.

Referring to FIG. 2, the light system 1 includes a lighting device 10, a lighting control device 12, and an illuminance measurement device 14.

The light device 10 is installed in a separate area within a building. A plurality of lighting devices 10 may be installed. The separate area within the building may be partitioned into a number of sections, and at least one lighting device 10 may be installed in each section. For example, lighting device A and lighting device B may be installed in section A and section B in a conference room, respectively. Said separate area within the building refers to an area that is influenced, not by external natural light, but solely by the lighting devices installed indoor. The external natural light may be sunlight.

The lighting control device 12 may recreate a lighting scene by controlling the lighting device 10 based on a lighting profile for the lighting scene. The lighting profile specifies rules for controlling each lighting device 10 in each section of the separate area in order to recreate an intended lighting scene. The lighting device 10 may be controlled for switching on/off, dimming level adjustment, color temperature adjustment, and the like.

In the exemplary embodiment, the lighting control device 12 models illuminance measured by the illuminance measurement device 14 in an actual environment. Then, the lighting control device 12 generates lighting profiles based on the illuminance model, and controls the lighting device 10 for each lighting scene according to a corresponding lighting profile. The illuminance model is constructed based on the analysis of actual illuminance of the lighting device 10 which is measured by the illuminance measurement device 14 in the area where said device 14 is installed. The illuminance model reflects an actual environmental element, such as a reflector, thereby allowing the lighting control that is responsive to changes in the real environment.

A plurality of lighting measuring devices 14 may be provided. Examples of the lighting measuring device 14 may include an illuminance sensor, but the aspects of the present disclosure are not limited thereto. A user or an operator may install both the lighting devices 10 and the lighting measuring devices 14 in a separate area, and then assign identifiers to the respective devices.

The exemplary embodiments of the present disclosure are used not only in the recreation of various lighting scenes, but also in various applications that need an illuminance model constructed based on the illuminance measured by the illuminance measurement device 14. The lighting scene may be differently recreated depending on the area, such as a conference room, an office room, and a classroom, or the purpose of use.

Figure 3:
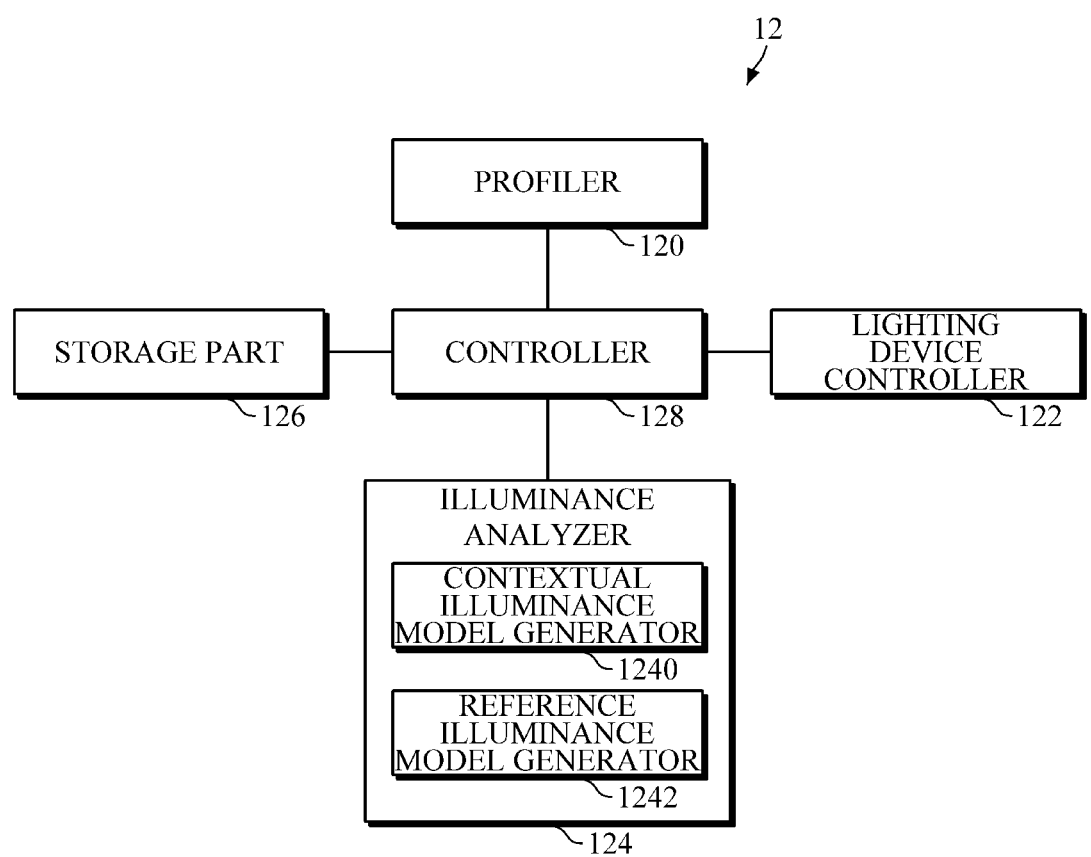
FIG. 3 is a diagram illustrating in detail the lighting control device of FIG. 2.

FIG. 3 is a diagram illustrating in detail the lighting control device of FIG. 2.

Referring to FIGS. 2 and 3, the lighting control device 12 includes a profiler 120, a lighting device controller 122, an illuminance analyzer 124, a storage part 126, and a controller 128.

The profiler 120 sets a lighting scene to be recreated by the lighting device(s), and generates a lighting profile for each of the lighting scenes set. Also, the profiler 120 modifies the lighting profile for each lighting scene to reflect the illuminance of each lighting device. The lighting profile is information required for the user to create the intended lighting scene by controlling each lighting device. The lighting profile may contain information about the switch ON/OFF state, dimming level, and color temperature of each lighting device for a corresponding lighting scene. Further, the lighting profile may contain information on a distance from each illuminance measurement device to each lighting device. The modified lighting profile is an environment-adaptive profile that is based on the illuminance model constructed from illuminance levels that were measured in the environment where the particular lighting scene had been actually recreated.

The lighting device controller 122 controls each of the lighting devices for a particular lighting scene according to the lighting profile. The lighting device controller 122 generates a lighting control signal according to the lighting profile and controls a corresponding lighting device. The lighting control signal may include at least one of the following signals: an ON/OFF control signal, a dimming level control signal, and a color temperature control signal.

The illuminance analyzer 124 analyzes the actual illuminance measured for each lighting device, and generates various illuminance models. Hereinafter, the illuminance model construction process performed by the illuminance analyzer 124 will be described. In a given separate area, a specific lighting scene is recreated by sequentially controlling lightings, and then the illuminance values of said lightings are measured and the sum of the measured illuminance values becomes an illuminance value at the measurement point. For example, if there are N number of lighting lamps, the illuminance value at a specific position is the same as the sum of illuminance values of the lighting lamps at said specific position. If three lighting lamps 1, 3, and N are switched on, the illuminance $L_A$ at point A is the sum of illuminances of the three lighting lamps, i.e., $L_A = L_1 + L_3 + L_N$. In a real environment, even with the same lightings, the illuminance at the same point may vary depending on the surroundings, for example, the presence or absence of a reflector near the luminaries, and hence a discrepancy may occur between the illuminance calculated by the above equation 1 and the sum of the illuminance values actually measured in the area. That is, an ideal illuminance value differs from the actual illuminance value in the real environment. Therefore, in order to construct the illuminance model that can provide consistent illuminance in correspondence with the user's desired lighting scene, the illuminance analyzer 124 considers the actual illuminance level measured at a specific position in the given separate area as the impact of the corresponding lighting device on the illuminance measurement device, and constructs the illuminance model based on this consideration.

The illuminance analyzer 124 includes a contextual illuminance model generator 1240 and a reference illuminance model generator 1242.

The reference illuminance model generator 1242 constructs a reference illuminance model. The reference illuminance model reflects the illuminance of each lighting device set to its maximum brightness level in the real environment. The reference illuminance model generator 1242 normalizes the illuminance measured by an illuminance measurement device to an impact of each lighting device to said illuminance measurement device, and constructs the reference illuminance model based on the normalization result, i.e., the impact of a respective lighting device to a respective illuminance measurement device.

In order to generate the reference illuminance model, the lighting device controller 122 sequentially activates the lighting devices to their maximum brightness. Then, each of the illuminance measurement devices at their measurement positions measures the illuminance of the respective lighting devices sequentially activated. At this time, the reference illuminance model generator 1242 sums up the illuminance levels measured at each of the measurement positions to generate the reference illuminance model for each of the measurement positions. For example, the reference illuminance model is generated by sequentially setting lighting devices 1 to N to their maximum brightness at particular position A, measuring, in turn, the illuminance of each of the sequentially turned-on lighting devices at position A where the illuminance measurement device is installed, and summing up the measured illuminance levels.

A method for generating the reference illuminance model according to the exemplary embodiment is as follows. It is assumed that N number of lighting devices with the same luminous intensity and M number of illuminance measurement devices with the same sensing capability are provided in the separate area. When an illuminance measurement device located at specific position i measures the illuminance level of each of the N number of lighting devices that are sequentially set to their maximum brightness, in which the measured illuminance is $L(i) = [l_1\ l_2\ \ldots\ l_N]$, M×N pieces of illuminance information are discontinuously generated. The measured illuminance, taken as a reference, reflects the characteristics of the actual environment of the area where the lighting devices set at their maximum brightness levels are present, and hence the measured illuminance can be normalized to the impact of the maximum brightness of each lighting device to the illuminance measurement device. Accordingly, the illuminance models are generated based on M×N pieces of distance information, M×N pieces of illuminance information, and the impacts obtained from the normalization. The lighting profile is modified using the generated illuminance models. Examples of the lighting profile modification may include adjustment of dimming levels. The lighting scene is recreated by controlling each lighting device according to the modified lighting profile.

The contextual illuminance model generator 1240 generates an illuminance model for each lighting scene. The illuminance model for each scene reflects the illuminance of each lighting device that is set in correspondence with the lighting scene in the actual environment. The contextual illuminance model generator 1240 recognizes the illuminance measured by each illuminance measurement device in a particular lighting scene in the actual environment as the impact of the corresponding lighting device to the relevant illuminance measurement device. The contextual illuminance model generator 1240 generates the illuminance model for each lighting scene based on the measured illuminance levels.

According to an illuminance model for a lighting scene for a "presentation," the brightness (e.g., an appropriate dimming level) of the lighting devices in each section is set by the lighting device controller 122 to a level $D(i) = [d_1\ d_2\ \ldots\ d_M]$, which is specified in the lighting profile, as desired by the user or operator. In a similar manner to the method for generating the reference illuminance model, each lighting device is sequentially controlled according to the settings and all illuminance measurement devices measure the illuminance level of each lighting device to generate M×N pieces of illuminance information.

According to the present disclosure, as an environment of the actual conference room may vary depending on the number and costumes of conference attendees, portable devices, and the like, the impacts of such factors are minimized. For the conference room, a lighting scene is recreated which can minimize the reflection of light that travels back from a screen onto which light beams were projected from a beam projector used for a presentation. The impacts of the surroundings may be reduced through the control of the lighting devices using the modified lighting profile based on the illuminance models, for example, reflecting calibration values that are converted into dimming values.

The controller 128 may control each element, and manage data transmitted between the elements. The storage part 126 stores various types of data that include the lighting profiles.

Figure 4:
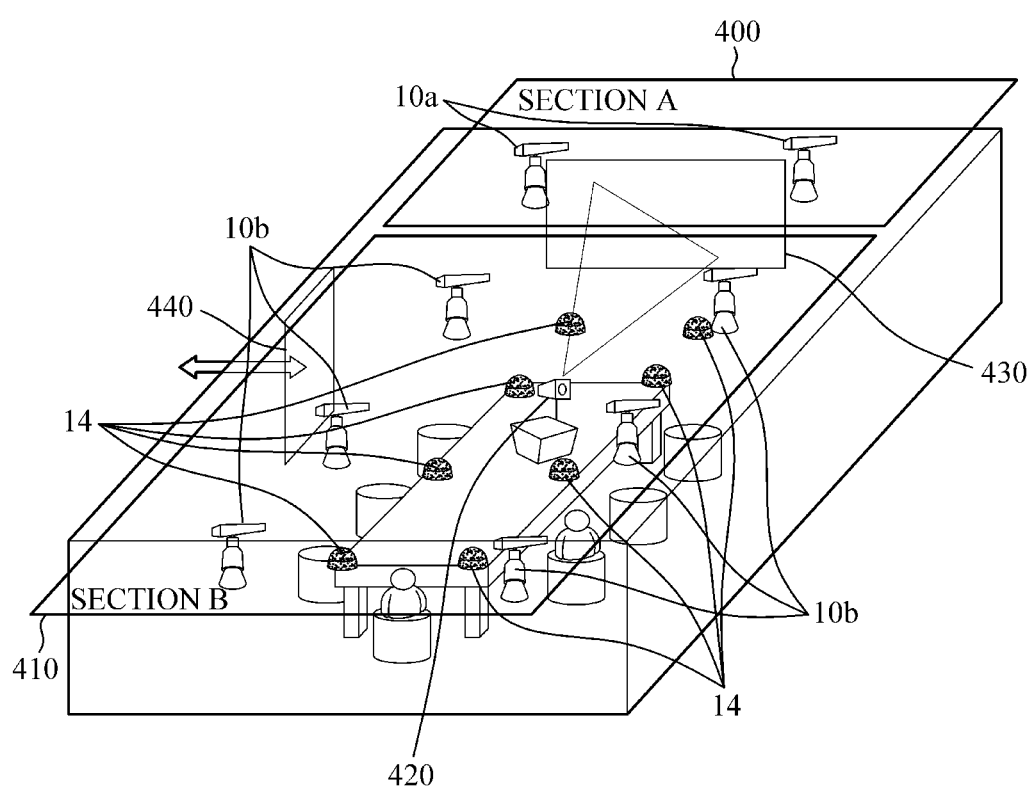
FIG. 4 is a diagram illustrating an example of recreation of a presentation lighting scene in a conference room based on an illuminance model according to an exemplary embodiment.

FIG. 4 is a diagram illustrating an example of recreation of a presentation lighting scene in a conference room based on an illuminance model according to an exemplary embodiment.

Referring to FIG. 4, the conference room is partitioned into section A 400 and section B 410. Lighting device A 10*a* and lighting device B 10*b* are installed in section A 400 and section B 410, respectively. Also, illuminance measurement devices 14 for measuring illuminance levels of the respective lighting devices are installed in both section A 400 and section B 410. An exit 440 is located in section B 410, a beam projector 420 for a representation is also installed in section B 410, and a screen 430 is positioned in section A 400.

Generally, the user may manually control a switch to turn off or lower the level of lighting device A 10A in order to make an image projected on the screen 430 seem clearer. Also, the brightness of each lighting device B 10*b* in section B 410 may be maintained at a level that the user wants so that participants in the conference room can feel comfortable.

The present disclosure, however, discloses a technology for automatically controlling lighting devices without manual control of switches of the lighting devices so as to recreate a lighting scene suitable for a presentation. As one example of a lighting scene for a presentation, lighting device A 10*a* in section A 400 is dimmed while each lighting device B 10*b* in section B 410 is set to an appropriate brightness level.

The lighting control device for recreating the lighting scene for a presentation controls each lighting device according to the lighting profile. For example, the lighting profile specifies that the lighting devices in section A 400 is switched off while each of the lighting devices in section B 410 are dimmed to a specific level. The lighting control device controls said lighting devices according to the corresponding lighting profile. The present exemplary embodiment may also be applicable to other situations related to the use of the conference room (e.g., when the conference room is not used or when a presenter enters the room). The determination as to whether the conference room is used for a presentation or for any other purpose may be made based on the combination of various sensing results, as well as the method as described with reference to FIG. 4.

Figure 5:
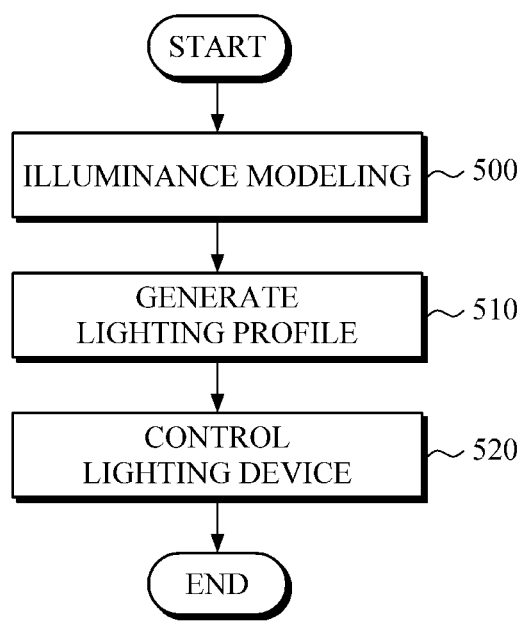
FIG. 5 is a flowchart illustrating a method for controlling a light based on an illuminance model according to an exemplary embodiment.

FIG. 5 is a flowchart illustrating a method for controlling a light based on an illuminance model according to an exemplary embodiment.

Referring to FIG. 5, the lighting control device models actual illuminance levels measured by an illuminance measurement device, as depicted in 500. Then, the lighting control device generates a lighting profile based on the resulting illuminance model, as depicted in 510. Then, the lighting control device controls lighting devices according to the generated lighting profile for the corresponding lighting scene, as depicted in 520.

In a building where a separate area is partitioned into a number of sections, at least one lighting device is installed in each section. The separate area within the building refers to an area that is influenced, not by external natural light, but solely by the lighting devices installed indoor.

In 510, the lighting control device sets details of each lighting scene to be recreated using the lighting devices. Then, the lighting control device generates a lighting profile for each lighting scene. The lighting control device modifies each of the generated lighting profiles using an illuminance model that reflects actual illuminance levels of the lighting devices measured in the real environment where the corresponding lighting scene was recreated according to the lighting profile. The lighting profile is information required for the user to create the intended lighting scene by controlling each lighting device. The lighting profile may contain information about, for example, the switch ON/OFF state, dimming level, and color temperature of each lighting device for the corresponding lighting scene.

In 500, the lighting control device generates a reference illuminance model and an illuminance model for each lighting scene.

In order to generate the reference illuminance model, the lighting control device sequentially activates the lighting devices to their maximum brightness. Then, each of the illuminance measurement devices at their measurement positions measures the illuminance levels of the respective lighting devices sequentially activated. Then, a reference illuminance model for each measurement position is generated from the sum of the measured illuminance levels at each of the measurement positions. In this case, the illuminance levels measured by each of the illuminance measurement devices are normalized to impacts of the respective lighting devices to the relevant illuminance measurement device, and the reference illuminance model may be generated using these impacts.

In order to generate the illuminance model for a lighting scene, the lighting control device controls each of the illuminance measurement devices to measure the illuminance level of each lighting device that is set in correspondence with the lighting scene in the actual environment. The lighting control device recognizes the illuminance level that is measured by each illuminance measurement device in a particular lighting scene in the actual environment as the impact of the lighting device to the relevant illuminance measurement device. In this way, the lighting control device generates the illuminance model for each lighting scene.

According to the exemplary embodiments as described above, an illuminance model for a separate area in a building, such as a conference room, an office room, and a classroom, is generated based on actual measurements of illuminance levels such that the surroundings, such as a reflector, can be reflected in the model. That is, impact of the illuminance of each lighting device to a particular point in the area is analyzed and various illuminance models are generated based on the analysis. These illuminance models are associated with the control of lighting devices for recreating a desired lighting scene, and contribute to the reduction in energy consumption. Particularly, the actual measurement-based illuminance models allow adaptive control of lighting devices in response to changes in the environment, for example, the introduction of a reflector, so that the brightness of the lighting devices can be consistently maintained at a level intended by the user.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A device for controlling lighting based on an illuminance model, the lighting control device comprising:
a profiler configured to set one or more lighting scenes to be recreated by one or more lighting devices in a separate area within a building, the separate area being partitioned into a plurality of sections, in each of which at least one of the lighting devices is installed, to generate a lighting profile for each of the set lighting scenes, and to modify the lighting profile by reflecting measured actual illuminance of the lighting devices;
a lighting device controller configured to control each of the lighting devices in correspondence with a specific lighting scene according to a lighting profile that corresponds to the specific lighting scene; and
an illuminance analyzer configured to analyze the measured actual illuminance of the lighting devices and construct an illuminance model based on the analysis result.

2. The device of claim 1, wherein the modified lighting profile is an environment-adaptive profile that is based on the illuminance model which has been constructed based on illuminance measured in an actually recreated lighting scene.

3. The device of claim 1,
wherein the lighting device controller recreates the specific lighting scene by controlling each of the lighting devices according to the lighting profile generated by the profiler, and
when an illuminance measurement device has measured an actual illuminance of each of the lighting devices, the illuminance analyzer analyzes the illuminance measured by the illuminance measurement device to construct the illuminance model for each lighting scene.

4. The device of claim 3, wherein the profiler modifies the lighting profile using the illuminance model for each lighting scene that is generated by the illuminance analyzer.

5. The device of claim 1, wherein the lighting profile is information required for a user to recreate an intended lighting scene by controlling each of the lighting devices, and contains information about switch ON/OFF state, dimming level, and color temperature of each lighting device for the lighting scene.

6. The device of claim 5, wherein the lighting profile further contains distance information between the lighting devices.

7. The device of claim 1, wherein the illuminance analyzer comprises a contextual illuminance model generator configured to construct an illuminance model for each lighting scene and a reference illuminance model generator configured to construct a reference illuminance model.

8. The device of claim 7,
wherein the lighting device controller sequentially activates the lighting devices to their maximum brightness, and
when each of illuminance measurement devices at their measurement positions measures illuminance levels of the respective lighting devices that are sequentially activated, the lighting device controller sums up the illuminance levels measured at each of the measurement positions to construct the reference illuminance model for each of the measurement positions.

9. The device of claim 7,
wherein the reference illuminance model reflects illuminance of each lighting device that is set to its maximum brightness level in an actual environment, and
the reference illuminance model generator normalizes the illuminance measured by an illuminance measurement device to an impact of each lighting device to said illuminance measurement device and constructs the reference illuminance model based on the impact resulting from normalization.

10. The device of claim 7,
wherein the illuminance model for each lighting scene reflects the illuminance of each lighting device that is set to a brightness level in correspondence with a specific lighting scene in an actual environment, and
the contextual illuminance model generator recognizes the illuminance of each lighting device, which is measured by the illuminance measurement device in the specific lighting scene in the actual environment, as an impact of the corresponding lighting device to the illuminance measurement device, and constructs the illuminance model for each lighting scene based on measured illuminance levels.

11. The device of claim 1,
wherein the lighting device controller generates a lighting control signal according to the lighting profile, and transmits the lighting control signal to a corresponding lighting device, and
the lighting control signal comprises at least one of the following signals: a ON/OFF control signal, a dimming level control signal, and a color temperature control signal.

12. The device of claim 1, wherein the separate area within the building refers to an area that is influenced, not by external natural light, but solely by the lighting devices installed indoor.

13. A method for controlling lighting based on an illuminance model, the method comprising:
generating an illuminance model based upon measuring actual illuminance by one or more illuminance measurement devices;
generating a lighting profile based on the illuminance model, wherein the lighting profile comprises information required for a user to recreate an intended lighting scene by controlling each of the lightning devices; and
controlling one or more lighting devices for each lighting scene according to the generated lighting profile.

14. The method of claim 13,
wherein the one or more lighting devices are installed in a separate area in a building that is partitioned into a plurality of sections, in each of which at least one of the lighting devices is installed, and
the separate area within the building refers to an area that is influenced, not by external natural light, but solely by the lighting devices installed indoor.

15. The method of claim 13,
wherein the generating of the lighting profile comprises setting one or more lighting scenes to be recreated by the lighting devices, generating the lighting profile for each of the set lighting scene, and modifying the lighting profile using the illuminance model for each lighting scene that reflects illuminance of each lighting device that was actually measured in a lighting scene which was recreated according to the generated lighting profile.

16. The method of claim 13,
wherein the lighting profile comprises information about switch ON/OFF state, dimming level, and color temperature of each lighting device for the lighting scene.

17. The method of claim 13,
wherein the generating an illuminance model comprises constructing a reference illuminance model, and constructing an illuminance model for each lighting scene.

18. The method of claim 17, wherein the constructing of the reference illuminance model comprises:
   sequentially activating the lighting devices to their maximum brightness levels,
   measuring, by using each of the illuminance measurement devices at their measurement positions, illuminance levels of the respective lighting devices that are sequentially activated, and
   summing up the illuminance levels measured at each of the measurement positions so as to construct the reference illuminance model for each of the measurement positions.

19. The method of claim 18, wherein the constructing of the reference illuminance model for each measurement position comprises
   normalizing the illuminance level measured by any of the illuminance measurement devices to an impact of each lighting device to the illuminance measurement device, and
   constructing the reference illuminance model based on the impact resulting from normalization.

20. The method of claim 17, wherein the constructing of the illuminance mode for each lighting scene comprises
   measuring, by using each of the illuminance measurement devices, illuminance of each lighting device that is set to a brightness level in correspondence with a specific lighting scene in an actual environment, and
   recognizing the measured illuminance level as an impact of the corresponding lighting device to the illuminance measurement device that measured the illuminance, and
   constructing the illuminance model for each lighting scene based on the measured illuminance levels.

* * * * *